United States Patent
Petit et al.

(10) Patent No.: US 10,677,411 B2
(45) Date of Patent: Jun. 9, 2020

(54) LUMINOUS SIGNALLING DEVICE WITH LCD

(71) Applicant: VALEO VISION, Bobigny (FR)

(72) Inventors: Julia Petit, Bobigny (FR); Kedar Sathaye, Bobigny (FR); Sebastien Neveu, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/369,636

(22) Filed: Mar. 29, 2019

(65) Prior Publication Data

US 2019/0301703 A1    Oct. 3, 2019

(30) Foreign Application Priority Data

Mar. 29, 2018  (FR) ...................... 18 52727

(51) Int. Cl.
| | |
|---|---|
| *B60Q 1/26* | (2006.01) |
| *F21S 43/20* | (2018.01) |
| *F21S 43/27* | (2018.01) |
| *F21V 3/02* | (2006.01) |
| *F21V 3/04* | (2018.01) |
| *G02B 27/28* | (2006.01) |
| *F21S 41/64* | (2018.01) |

(Continued)

(52) U.S. Cl.
CPC ............ *F21S 43/26* (2018.01); *F21S 41/135* (2018.01); *F21S 41/645* (2018.01); *F21S 43/27* (2018.01); *F21V 3/02* (2013.01); *F21V 3/049* (2013.01); *G02B 27/285* (2013.01); *G02B 27/286* (2013.01); *B60Q 1/30* (2013.01); *B60Q 1/503* (2013.01)

(58) Field of Classification Search
CPC . B60Q 1/50; B60Q 1/503; B60Q 1/30; B60Q 1/28; B60Q 1/26; B60Q 1/2619; F21S 43/26; F21S 43/27; F21S 41/135; F21S 41/645
USPC ......................................................... 362/509
See application file for complete search history.

(56) References Cited

U.S. PATENT DOCUMENTS

| | | | |
|---|---|---|---|
| 6,101,032 A | 8/2000 | Wortman et al. | |
| 6,396,631 B1 | 5/2002 | Ouderkirk | |

(Continued)

FOREIGN PATENT DOCUMENTS

| | | |
|---|---|---|
| DE | 710250 | 9/1941 |
| DE | 10 2013 113 807 A1 | 6/2015 |

(Continued)

OTHER PUBLICATIONS

French Preliminary Search Report dated Nov. 21, 2018 in French Application 18 52727, filed on Mar. 29, 2018 (with English Translation of Categories of Cited Documents).

*Primary Examiner* — Christopher M Raabe
(74) *Attorney, Agent, or Firm* — Oblon, McClelland, Maier & Neustadt, L.L.P.

(57) ABSTRACT

A luminous signalling module for a motor vehicle, including a liquid-crystal display with a back face and a front face; a backlighting panel placed facing the back face of the liquid-crystal display, configured to backlight the liquid-crystal display with a view to forming, by transmission through the display, a luminous image; and a depolarizing optical device, for example a diffuser, facing the front face of the liquid-crystal display, configured to cancel out a linear polarization of the luminous image generated by the liquid-crystal display.

20 Claims, 1 Drawing Sheet

(51) Int. Cl.
*F21S 41/135* (2018.01)
*B60Q 1/30* (2006.01)
*B60Q 1/50* (2006.01)

(56) References Cited

U.S. PATENT DOCUMENTS

| | | |
|---|---|---|
| 2003/0165060 A1 | 9/2003 | Ouderkirk et al. |
| 2007/0058257 A1* | 3/2007 | Lynam .................. B60Q 1/2665 359/604 |
| 2007/0121046 A1* | 5/2007 | Toko .......................... G02F 1/29 349/127 |
| 2011/0141381 A1* | 6/2011 | Minikey, Jr. ............ B60R 1/088 349/11 |
| 2012/0056738 A1* | 3/2012 | Lynam .................. B60R 1/1207 340/468 |
| 2012/0313392 A1* | 12/2012 | Bingle .................. B60R 13/005 296/1.08 |
| 2016/0377251 A1* | 12/2016 | Kim .................. G06K 9/00791 362/466 |
| 2017/0334341 A1* | 11/2017 | Kurashige ............... F21S 41/36 |

FOREIGN PATENT DOCUMENTS

| | | |
|---|---|---|
| EP | 3 205 928 A1 | 8/2017 |
| EP | 3 208 531 A2 | 8/2017 |
| FR | 2 846 756 A1 | 5/2004 |

* cited by examiner

LUMINOUS SIGNALLING DEVICE WITH LCD

The invention relates to the field of signalling lights, and more particularly to motor-vehicle signalling lights.

The patent document published under the number FR 3 026 689 A1 discloses a luminous motor-vehicle signalling device, in this case a rear light, configured to display a pictogram on a zone of a display screen. The pictogram is produced by a first luminous module possibly comprising a digital micromirror device able to be controlled and to produce various pictograms. According to one variant, the first module may be a liquid-crystal display (LCD). The device may also comprise a second luminous module configured to illuminate another zone of the display screen, which is distinct from the zone displaying the pictogram. Such a device is advantageous in that it allows pictograms to be displayed in the luminous area of a signalling light, in this case a rear motor-vehicle light.

Generally, liquid-crystal displays make use of the polarization of light by polarizing filters and the birefringence of certain nematic liquid crystals, the orientation of which may be made to vary as a function of the applied electric field. A liquid-crystal display consists of two polarizers the polarization directions of which make an angle of 90°, said polarizers being placed on each side of a sandwich formed from two glass sheets flanking the liquid crystals. The two internal faces of the glass sheets comprise a matrix array of transparent electrodes for black and white. For colour displays, the basic principle is the same, however three cells are required per pixel and the sandwich is completed with a colour filter of red, green and blue segments.

It follows that the light from a luminous module using a liquid-crystal display is polarized in a given direction, defined by the exit polarizing filter of the display. The use of polarized glasses by an observer may thus lead to complete occultation of the luminous image when the polarization direction of said image is perpendicular to the polarization direction of the glasses. The latter direction is conventionally vertical, essentially in order to filter the reflection of the sun's rays from glassy surfaces, such as for example from the surface of an expanse of water, this reflection having the effect of polarizing the light in a direction parallel to the surface of the water. Thus, liquid-crystal displays, in particular on the dashboards of vehicles, conventionally have a polarization direction that is inclined at 45°. An observer wearing glasses that are vertically polarized will however perceive the image produced with such a display to be substantially less bright, namely about 50% less bright.

In the field of signalling lights, and more particularly when the latter have a direct impact on human safety, as is the case in motor-vehicle signalling lights, liquid-crystal displays may not be perceived as they should by observers wearing polarized glasses.

The objective of the invention is to at least partially mitigate one of the drawbacks of the aforementioned prior art. More particularly, the objective of the invention is to prevent luminous images produced by a luminous module using a liquid-crystal display from not being perceived as they should be.

One subject of the invention is a luminous signalling module, in particular for a motor vehicle, comprising a liquid-crystal display with a back face and a front face; a backlighting panel placed facing the back face of the liquid-crystal display, configured to backlight the liquid-crystal display with a view to forming, by transmission through said display, a luminous image; noteworthy in that the module furthermore comprises a depolarizing optical device facing the front face of the liquid-crystal display, configured to cancel out a linear polarization of the luminous image generated by the liquid-crystal display.

Advantageously, the depolarizing optical device is a depolarizer.

Advantageously, the backlighting panel extends over at least 80% of the back face of the liquid-crystal display. Advantageously, the backlighting panel comprises light sources uniformly distributed over its extent. Advantageously, the backlighting panel is located at distance from the back face of the liquid-crystal display.

Advantageously, the luminous image comprises pictograms.

According to one first variant of the invention, the depolarizing optical device is a light diffuser.

According to one advantageous embodiment of the invention, the light diffuser forms a translucent or transparent screen with an entrance face and an exit face, at least one of said faces having a relief with microstructures.

According to one advantageous embodiment of the invention, the face of the translucent or transparent screen having a relief with microstructures is the exit face.

According to one advantageous embodiment of the invention, the light diffuser is of circular type.

According to one advantageous embodiment of the invention, the light diffuser has a scattering angle larger than or equal to 30°.

According to one advantageous embodiment of the invention, the light diffuser is of elliptical type.

According to one advantageous embodiment of the invention, the light diffuser has a small scattering angle larger than or equal to 10° and/or a large scattering angle larger than or equal to 60°.

According to one advantageous embodiment of the invention, the light diffuser comprises a translucent or transparent film or screen adhesively bonded to or laid flat against the front face of the liquid-crystal display or stretched over a frame placed at distance from the front face of the liquid-crystal display.

According to another variant of the invention, the depolarizing optical device is a quarter-wave delay plate.

Advantageously, the luminous image corresponds to a motor-vehicle lighting function.

Another subject of the invention is a luminous device comprising a casing with an aperture; an outer lens fastened to the casing so as to close the aperture; at least one luminous signalling module; noteworthy in that the or one of the luminous signalling modules is according to the invention.

Advantageously, the luminous device is a rear motor-vehicle light.

The measures of the invention are advantageous in that they ensure the luminous image produced by the module is correctly perceived, in particular when the observer is wearing polarized glasses, independently of the orientation of the glasses in question with respect to the polarization direction of the exit polarizing filter of the liquid-crystal display.

Other features and advantages of the present invention will be better understood from the description and the drawings, in which.

Figure 1:
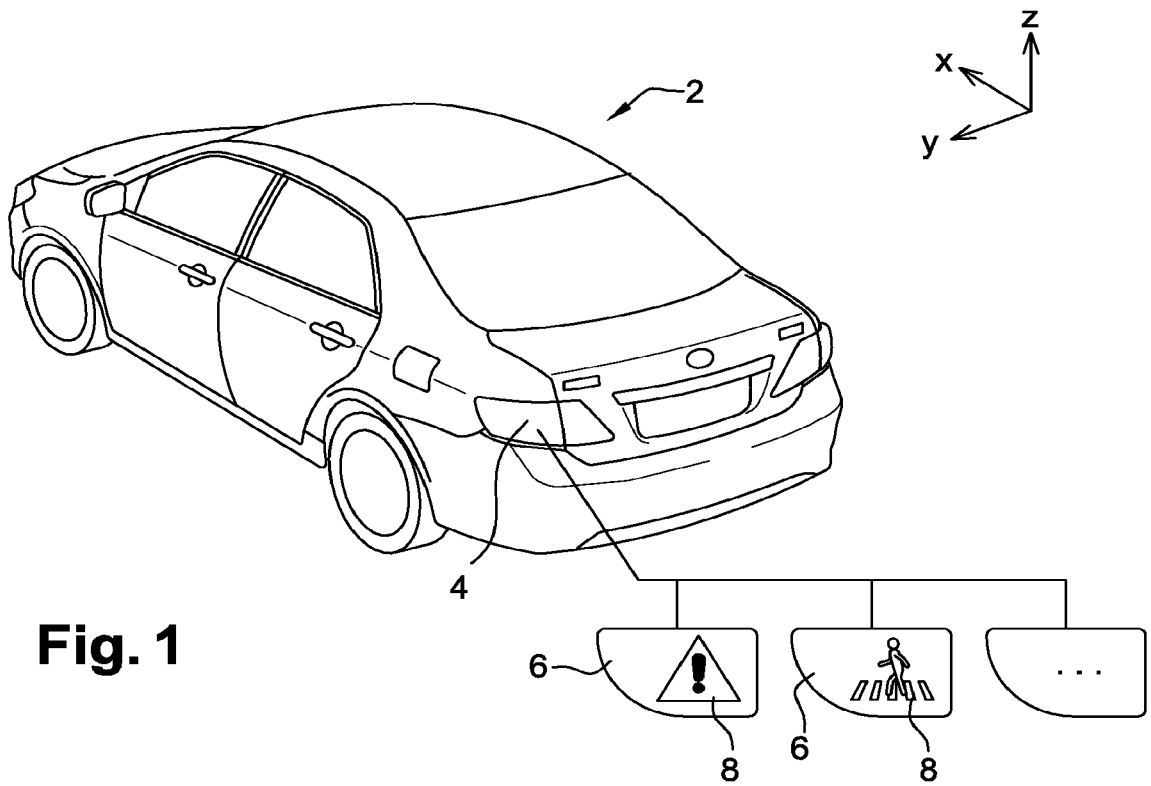
FIG. 1 is an illustration of a rear signalling light of a vehicle able to produce luminous images by means of a liquid-crystal display, comprising a luminous module according to the invention and forming a luminous device according to the invention.

FIG. 1 illustrates a vehicle 2 equipped with two rear lights 4 each comprising a signalling module according to the invention. The rear lights 4 are configured to form, on their exterior surface 6, luminous images forming pictograms 8. These pictograms may in particular indicate to people located behind the vehicle 2 certain items of information such as the presence of a danger or even the fact that a pedestrian is in the process of crossing the road in front of the vehicle in question. It will be understood that the pictograms may take other forms than those illustrated and provide information on situations other than those illustrated.

Figure 2:
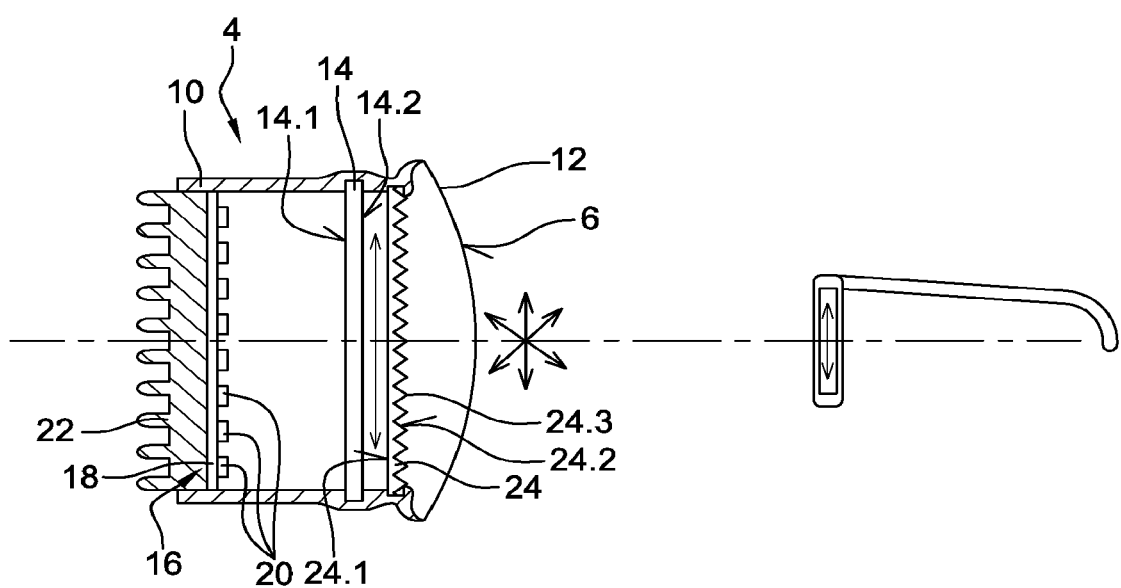
FIG. 2 is a cross-sectional schematic view of the luminous device of FIG. 1.

FIG. 2 is a schematic horizontal cross-sectional view of the left rear light of FIG. 1, it being understood that the right rear light is generally symmetric to the left rear light.

The rear light 4 comprises a casing 10 with an aperture that is closed by an outer lens 12 forming the exit surface 6 of the rear light. The casing 10 in question houses a luminous signalling module made up essentially of a liquid-crystal display 14, a backlighting panel 16 and a depolarizing optical device, here taking the form of a light diffuser 24.

More specifically, the liquid-crystal display 14 comprises a back face 14.1 and a front face 14.2. The backlighting panel 16 is for its part made up essentially of a platen 18 and of light sources 20 placed on a face of the platen placed facing the back face 14.1 of the liquid-crystal display 14. A heat sink 22, possibly taking the form of a radiator with cooling fins, may be placed on the opposite face of the platen 18, with a view to ensuring cooling of the light sources 20. The latter are advantageously light-emitting diodes.

According to a first variant embodiment, the depolarizing optical device according to the invention is a light diffuser 24. It forms a screen made of transparent or translucent material placed facing the front face 14.2 of the liquid-crystal display 14. It comprises an entrance face 24.1 and an exit face 24.2 for the light. One of the faces in question, in the present case the exit face 24.2, has a relief with microstructures 24.3. The latter have been expressly shown enlarged, for the sake of clarity of the description, it being understood that they are in fact substantially smaller, namely of the order of one micron in size. These microstructures may be likened to micro-prisms able to deviate, by refraction and in various directions, the light rays that encounter them. Therefore, light rays exiting from the front face 14.2 of the liquid-crystal display, which are polarized linearly in the polarization direction of the exit polarizing filter of the screen, are then depolarized by way of the light diffuser 24. In this way, an observer wearing polarized glasses, independently of the orientation of the polarization direction, will be able to perceive the luminous image with very little loss of brightness. Specifically, among the various emitted and transmitted light waves, only components perpendicular to the polarization direction of glasses will be blocked by said glasses, while components parallel to the polarization direction will undergo no absorption.

The light diffuser 24 is advantageously a film made of a transparent or translucent plastic, such as polycarbonate (PC) or polyester (PE), forming a substrate on which an epoxy resin is deposited and in which the relief is imprinted. Such films are commercially available, in particular from Luminit®. They may have a thickness larger than or equal to 0.1 mm and/or smaller than or equal to 0.3 mm. The film in question may be placed on and adhere directly to the front face 14.2 of the liquid-crystal display 14. Alternatively, it may be stretched over a frame and placed at distance from the front face 14.2 of the liquid-crystal display 14, as illustrated in FIG. 2. The light diffuser 24 may also be a plate made from the same material as the aforementioned film, but more rigid. Similarly to the film stretched over a frame, the plate may be placed at distance from the front face 14.2 of the liquid-crystal display 14, as illustrated in FIG. 2.

The light diffuser 24 may be of circular type, i.e. one that scatters identically in every angular direction with respect to an optical axis of the entering light rays. It may have a circular scattering angle $\Delta$ larger than or equal to 30°. In the case of an entering light beam that is divergent by an angle $\alpha$, the scattering angle $\beta$ at the exit of the light diffuser 24 may be estimated using the following relationship:

$$\beta = \sqrt{\alpha^2 + \Delta^2}$$

In this relationship, the scattering angle $\beta$ is the total angle corresponding to the full width at half maximum of the Gaussian distribution of a collimated source after having passed through the diffuser. This angle and the above relationship do not depend on wavelength when the latter is comprised between 360 and 1600 nm.

The light diffuser 24 may be of elliptical type, i.e. it scatters differently in two perpendicular directions. The small scattering angle $\Delta$ may be larger than or equal to 10° and/or smaller than or equal to 30°. The large scattering angle $\Delta$ may be larger than or equal to 30° and/or smaller than or equal to 60°. In the case of an entering light beam that is divergent by an angle $\alpha$, the exiting beam then has an elliptical shape with two scattering angles $\beta$ in the two perpendicular directions, one being a minimum angle and the other being a maximum angle. These angles may be estimated with the above relationship.

According to another variant embodiment, the depolarizing optical device may also be a quarter-wave plate or quarter-wave delay plate. A quarter-wave plate, also referred to as a $\lambda/4$ plate, is a parallel faced plate that creates a phase shift of 90°, i.e. a delay of one quarter wavelength. Advantageously, the quarter-wave plate is placed so that the angle between the exit polarization of the liquid-crystal display 14 and the axis of the quarter-wave plate is 45°.

The quarter-wave plate makes it possible to pass from a linear polarization to an elliptical or even circular polarization. The luminous image thus depolarized will be able to be correctly perceived by an observer wearing polarized glasses because the polarization of such glasses is linear and therefore not liable to absorb a substantial portion of the elliptically or circularly polarized light.

The invention claimed is:

1. Luminous signalling module for a motor vehicle, comprising:
   a liquid-crystal display with a back face and a front face;
   a backlighting panel placed facing the back face of the liquid-crystal display, configured to backlight the liquid-crystal display with a view to forming, by transmission through said display, a luminous image;
   characterized in that the module furthermore comprises:
   a depolarizing optical device facing the front face of the liquid-crystal display, configured to cancel out a linear polarization of the luminous image generated by the liquid-crystal display.

2. Luminous signalling module according to claim 1, wherein the depolarizing optical device is a light diffuser.

3. Luminous signalling module according to claim 2, wherein the light diffuser forms a translucent or transparent screen with an entrance face and an exit face, at least one of said entrance face and exit face having a relief with microstructures.

4. Luminous signalling module according to claim 3, wherein the face of the translucent or transparent screen having a relief with microstructures is the exit face.

5. Luminous signalling module according to claim 2, wherein the light diffuser is of circular type.

6. Luminous signalling module according to claim 5, wherein the light diffuser has a scattering angle $\Delta$ larger than or equal to 30°.

7. Luminous signalling module according to claim 2, wherein the light diffuser is of elliptical type.

8. Luminous signalling module according to claim 7, wherein the light diffuser has a small scattering angle $\Delta$ larger than or equal to 10° and/or a large scattering angle $\Delta$ larger than or equal to 60°.

9. Luminous signalling module according to claim 2, wherein the light diffuser comprises a translucent or transparent film adhesively bonded to the front face of the liquid-crystal display or stretched over a frame placed at distance from the front face of the liquid-crystal display.

10. Luminous signalling module according to claim 1, wherein the depolarizing optical device is a quarter-wave delay plate.

11. Luminous device comprising:
a casing with an aperture;
an outer lens fastened to the casing so as to close the aperture;
at least one luminous signalling module;
characterized in that
the or one of the luminous signalling modules is according to claim 1.

12. Luminous signalling module according to claim 3, wherein the light diffuser is of circular type.

13. Luminous signalling module according to claim 3, wherein the light diffuser is of elliptical type.

14. Luminous signalling module according to claim 3, wherein the light diffuser comprises a translucent or transparent film adhesively bonded to the front face of the liquid-crystal display or stretched over a frame placed at distance from the front face of the liquid-crystal display.

15. Luminous device comprising:
a casing with an aperture;
an outer lens fastened to the casing so as to close the aperture;
at least one luminous signalling module;
characterized in that
the one of the luminous signalling modules is according to claim 2.

16. Luminous signalling module according to claim 4, wherein the light diffuser is of circular type.

17. Luminous signalling module according to claim 4, wherein the light diffuser is of elliptical type.

18. Luminous signalling module according to claim 4, wherein the light diffuser comprises a translucent or transparent film adhesively bonded to the front face of the liquid-crystal display or stretched over a frame placed at distance from the front face of the liquid-crystal display.

19. Luminous device comprising:
a casing with an aperture;
an outer lens fastened to the casing so as to close the aperture;
at least one luminous signalling module;
characterized in that
the or one of the luminous signalling modules is according to claim 3.

20. Luminous signalling module according to claim 5, wherein the light diffuser is of elliptical type.

* * * * *